US009626859B2

(12) United States Patent
Ribas et al.

(10) Patent No.: US 9,626,859 B2
(45) Date of Patent: Apr. 18, 2017

(54) ELECTRONIC LOCKING SYSTEMS, METHODS, AND APPARATUS

(71) Applicant: Digilock Asia Ltd., Kowloon (HK)

(72) Inventors: Gabriel Bestard Ribas, San Francisco, CA (US); Steven Thomas Bakondi, San Francisco, CA (US); Lloyd Seliber, San Mateo, CA (US)

(73) Assignee: DIGILOCK ASIA LIMITED, Petaluma, CA (US)

( * ) Notice: Subject to any disclaimer, the term of this patent is extended or adjusted under 35 U.S.C. 154(b) by 594 days.

(21) Appl. No.: 13/889,241

(22) Filed: May 7, 2013

(65) Prior Publication Data

US 2013/0271261 A1 Oct. 17, 2013

Related U.S. Application Data

(63) Continuation-in-part of application No. PCT/ES2013/070229, filed on Apr. 10, 2013.

(60) Provisional application No. 61/692,324, filed on Aug. 23, 2012.

(30) Foreign Application Priority Data

Apr. 11, 2012 (ES) .................................. 201230535

(51) Int. Cl.

| | |
|---|---|
| ***G08C 17/02*** | (2006.01) |
| ***G08B 13/12*** | (2006.01) |
| ***G06K 5/00*** | (2006.01) |
| ***H04K 1/00*** | (2006.01) |
| ***G07F 7/10*** | (2006.01) |
| ***G07B 15/00*** | (2011.01) |
| *G07C 9/00* | (2006.01) |

(52) U.S. Cl.
CPC ......... *G08C 17/02* (2013.01); *G07C 9/00817* (2013.01); *G07C 9/00571* (2013.01); *G07C 2009/00825* (2013.01); *G07C 2009/00865* (2013.01)

(58) Field of Classification Search
CPC ................................ G08C 17/02; G08B 13/12
USPC ............... 340/5.65, 5.54, 5.51, 5.2; 455/411; 364/562; 380/25; 700/94
See application file for complete search history.

(56) References Cited

U.S. PATENT DOCUMENTS

| | | | | | |
|---|---|---|---|---|---|
| 4,677,284 | A * | 6/1987 | Genest | E05B 49/002 | 235/382 |
| 5,668,876 | A * | 9/1997 | Falk | G06F 21/31 | 235/380 |
| 6,084,532 | A * | 7/2000 | Prieto | G07B 15/04 | 235/384 |
| 6,097,306 | A * | 8/2000 | Leon | G07C 1/32 | 340/10.1 |
| 6,900,720 | B2 * | 5/2005 | Denison | G07C 9/00309 | 340/10.1 |
| 6,945,303 | B2 * | 9/2005 | Weik, III | B60R 25/00 | 160/188 |

(Continued)

*Primary Examiner* — Nam V Nguyen
(74) *Attorney, Agent, or Firm* — Ascenda Law Group, PC

(57) ABSTRACT

Electronic locking devices, systems, and methods may require the utilization of an electronic key generated by an electronic key generation device. The electronic key may be generated using a data payload received from server and/or an administrative device. The administrative device is enabled to remotely manage the locking device and locking system via, for example, a software application running on the administrative device and/or a website.

17 Claims, 7 Drawing Sheets

(56) References Cited

U.S. PATENT DOCUMENTS

| | | | | |
|---|---|---|---|---|
| 7,012,503 | B2 * | 3/2006 | Nielsen .............. | G07C 9/00103 340/5.6 |
| 7,084,736 | B2 * | 8/2006 | Ritter ................... | G06Q 20/341 340/5.6 |
| 7,821,395 | B2 * | 10/2010 | Denison ............. | G07C 9/00309 340/5.1 |
| 8,437,740 | B2 * | 5/2013 | Despain ................. | A47G 29/10 340/5.73 |
| 8,671,055 | B2 * | 3/2014 | Spodak ............ | G06K 19/06187 705/41 |
| 8,756,431 | B1 * | 6/2014 | Despain ................ | G06F 21/305 713/155 |
| 8,912,880 | B2 * | 12/2014 | Ritter ................... | G06Q 20/341 340/5.2 |
| 9,269,221 | B2 * | 2/2016 | Gobbi | |
| 2010/0198376 | A1 * | 8/2010 | MacKenzie ............ | G08C 17/02 700/94 |
| 2013/0194067 | A1 * | 8/2013 | Kimbrell ................. | G06F 21/31 340/5.54 |

* cited by examiner

ELECTRONIC LOCKING SYSTEMS, METHODS, AND APPARATUS

RELATED APPLICATIONS

This application is a Nonprovisional of, claims priority to, and incorporates by reference U.S. Provisional Application No. 61/692,324 filed Aug. 23, 2012, and is a Continuation-in-Part of co-pending International Application No. PCT/ES13/070229, filed Apr. 10, 2013, which designates the United States of America, is incorporated herein by reference, and claims priority to Spanish Patent Application No. ES201230535, filed Apr. 11, 2012.

FIELD OF INVENTION

The present invention relates to a system, method, and apparatus for electronically locking and unlocking a locking device.

BACKGROUND

Traditional electronically enabled locks are difficult to program and manage often requiring the direct manual reconfiguration of each lock within a system and it is difficult to update or otherwise manage the access privileges of various users of an electronic lock.

BRIEF DESCRIPTION OF THE DRAWINGS

The present application is illustrated by way of example, and not limitation, in the figures of the accompanying drawings, in which.

Figure 1:
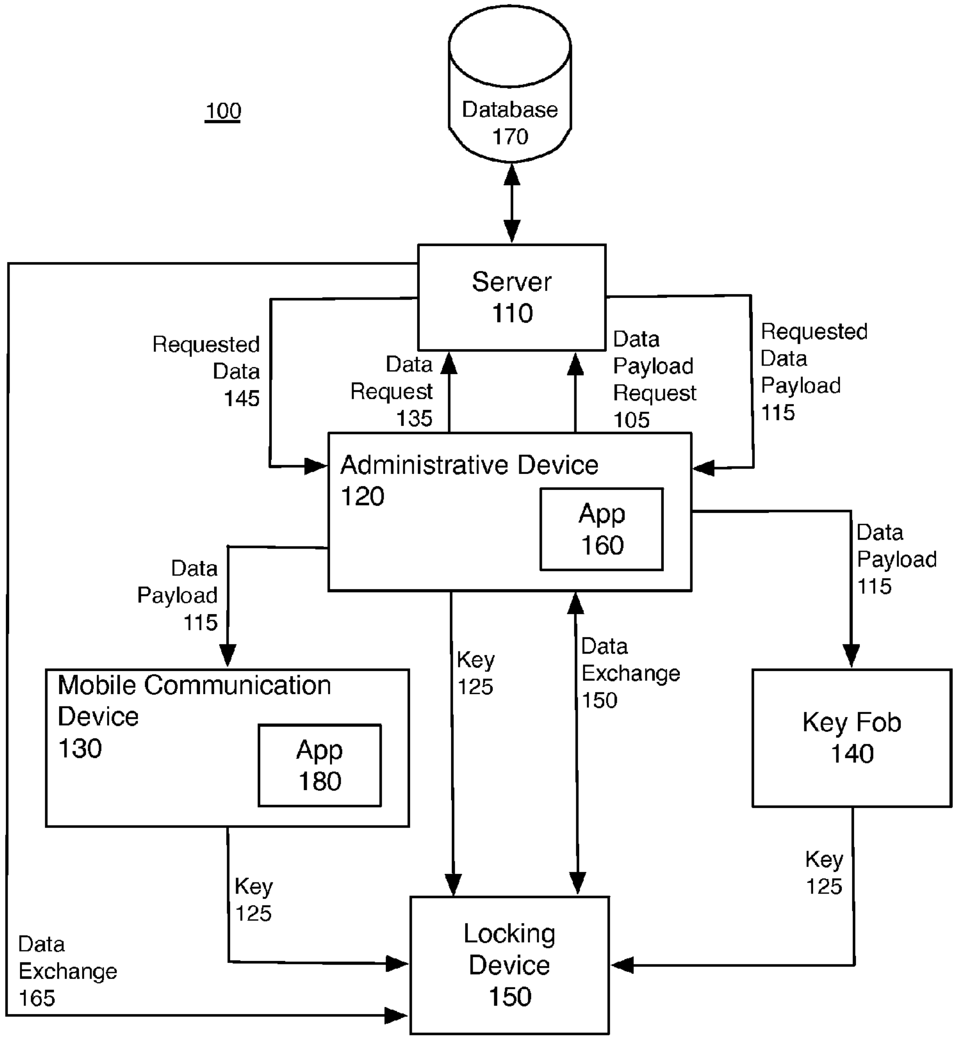
FIG. 1 depicts a block diagram of an exemplary locking system, consistent with an embodiment of the present invention.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

SUMMARY

Electronic locking systems, methods, and apparatus are herein described. According to one method, an electronic key generation device may receive a data payload. A request to generate an electronic key to a locking device may then be received and the electronic key may be generated responsively to the request. The electronic key may then be transmitted to the locking device.

In an alternative embodiment, an encrypted electronic key may be received at a processor included within a locking device. The key may be received from an electronic key generation device. The electronic key may be decrypted and a data payload may be extracted from the decrypted electronic key. It may then be determined whether the data payload is included within a list of permissible data payloads and a locking mechanism communicatively coupled to the processor and included within the locking device may be instructed to translate from a closed position to an open position or from the open position to the closed position responsively to the determination.

In one embodiment, a request for a data payload may be transmitted to a server. The request may include information specific to an electronic key generation device. The requested data payload may then be received from the server by the administrative device. The requested data payload may enable a receiving electronic key generation device to generate an electronic key. The received data payload may then be transmitted from the administrative device to the electronic key generation device.

Written Description

FIG. 1 depicts a block diagram of a locking system 100. The components of locking system 100 may be communicatively coupled via wired and/or wireless communication links. At times, a communication network (not shown) may facilitate wireless communication between the components of locking system 100 such as a local area network (LAN), a wireless LAN (WLAN), and/or the Internet.

Exemplary components of locking system 100 include a server 110, an administrative device 120, a mobile communication device 130, a key fob 140, a locking device 150, and a database 170. Optionally, a software application, or app, 180 may reside within mobile communication device 130. A software application 160 may also reside on administrative device. Software applications 160 and 180 may be modified versions of one another such that software application 160 grants more administrative/management access to locking system 100 than software application 180. On some occasions, administrative device 120, mobile communication device 130, and/or key fob 140 may be collectively referred to as an electronic key generation device.

Administrative device 120 may be, for example a mobile communication device (e.g., a mobile phone, tablet computer, or laptop computer) or a stationary communication device (e.g., desktop computer) enabled to communicate with the components of locking system 100. In some embodiments, communication with components of locking system 100 may be facilitated by software application 160 running on administrative device 120. In some instances, communication between administrative device 120 and one or more components of locking system 100 may be facilitated by a website provided via the Internet.

Administrative device 120 may be configured to administer and/or manage one or more components of locking system 100. For example, administrative device 120 may be configured to communicate a data payload request 105 to server 110. Data payload request 105 may include information useful to server 110 when generating the requested data payload. For example, data payload request 105 may include one or more identifying attributes for an intended recipient of the data payload, such as mobile communication device 130, administrative device 120, and/or key fob 140. In some embodiments, data payload request may include one or more rules concerning the intended recipient's access privileges (e.g., locking and/or unlocking privileges) to locking system 100. Exemplary rules concerning access privileges include date and/or time periods within which an intended recipient may gain entry to a facility including locking system 100 and, in some cases, may include a periodic frequency (e.g., a particular day, range or days, or time of day) for granting access to locking system 100. Additionally, or alternatively, the rules may include one or more personalized instructions or messages (e.g., a personalized greeting or status update).

Upon receipt of data payload request 105, server 110 may generate a requested data payload 115 and transmit same to administrative device 120. On some occasions, data payload 115 may be encrypted using one or more encryption methods prior to transmission to administrative device 120. Administrative device 120 may then store data payload 115 for future use and/or transmit data payload 115 to, for example, mobile communication device 130 and/or key fob 140. Optionally, administrative device 120 may transmit the encrypted data payload 115 or may decrypt the data payload 115 prior to transmission. On some occasions, when the data payload 115 received from server 110 is not encrypted, administrative device 120 may encrypt data payload 115 prior to transmission.

Upon receipt of data payload 115, administrative device 120, mobile communication device 130, and/or key fob 140 may be enabled to generate an electronic key 125 using data payload 115. On some occasions, data payload 115 and/or electronic key 125 may be unique to the receiving administrative device 120, mobile communication device 130, and/or key fob 140.

At times, security measures installed upon a receiving device and/or within data payload 115 and/or electronic key 125 may prevent data payload 115 and/or electronic key 125 from being copied or otherwise transferred from the intended recipient to another device. However, at times, such copying and/or transference of data payload 115 and/or electronic key 125 to another device may be allowed by, for example, administrative device 120 and/or server 110.

Mobile communication device 130 and/or key fob 140 may be any device enabled to store data payload 115, generate an electronic key 125, and communicate with the components of system 100 via, for example, cellular communications, Wi-Fi communications, and/or an electromagnetic signal including, but not limited to, an ultrasonic signal, an infrared signal, a short-wavelength radio signal, a telecommunication signal, a cellular communication signal, a near-field radio signal, a Bluetooth™ signal, a Bluetooth™ low energy signal, and a Wi-Fi signal.

In addition, mobile communication device 130 may be enabled to store and run software application 180. Software application 180 may enable generation and transmission of the electronic key 125 to locking device 150. Software application 180 may further enable communication between mobile communication device 130 and administrative device 120 and/or locking device 150.

Locking device 150 may be any device in able to lock and/or unlock a facility responsively to receiving electronic key 125. Further details with regard to the components and functions performed by locking device 150 are provided below with regard to FIGS. 3 and 4. In some embodiments, locking device 150 may be enabled to record activity associated with locking device 150 (e.g., locking and/or unlocking of the device and alarm conditions generated by the device) and, in some cases, may transmit these records to, for example, server 110 via data exchange 165. Additionally, or alternatively, locking device 150 may receive information regarding the access privileges associated with one or more electronic keys 125 via data exchange 165. In some embodiments, some and/or all data exchanged between locking device 150 and server 110 may be stored in database 170.

In some embodiments, the administrative device 120 may be enabled to request data regarding the operation of locking system 100 from server 110 via transmission of a data request 135. Server 110 may then transmit requested data 145 to administrative device 120. Exemplary requested data 145 may include, for example, a status of locking device 150 (e.g., locked or unlocked), an indication of accesses or attempted accesses of locking device 150, in indication of the status for mobile communication device 130 and/or key fob 140.

At times, communication between administrative device 120 and server 110 may be implemented via a website facilitated by a network, such as, the Internet. Such communication may include, for example, transmission of requests, such as data payload request 105 and data request 135 and receipt of data, such as data payload 115 and requested data 145. Administrative device 120 may also manage system 100 via the website and may, for example, establish access privileges for itself, mobile communication device 130, and/or key fob 140. Management of system 100 may also include modification of access privileges for mobile communication device 130 and/or key fob 140 and sending a notification to server 110 and/or locking device 150 of the modification. Administrative device 120 may also access data stored in database 170 via the website. In some embodiments, administrative device 120 may be able to configure one or more settings of locking device 150 via, for example, direct interaction with locking device 150 and/or the website.

In some embodiments, locking system 100 may include a plurality of mobile communication devices 130, key fobs 140, and/or locking devices 150. In some instances, the operation of the plurality of components may be linked or otherwise associated, while in other instances, this may not be the case. For example, in an embodiment wherein locking system 100 includes a plurality of locking devices 150, locking system 100 may be configured such that a change to one locking device 150 may be communicated to some, or all, of the remaining locking devices 150 included within locking system 100. In an alternative embodiment, the opposite may be true such that a change to one locking device 150 has no effect upon the remaining locking devices 150 included within locking system 100.

Figure 2:
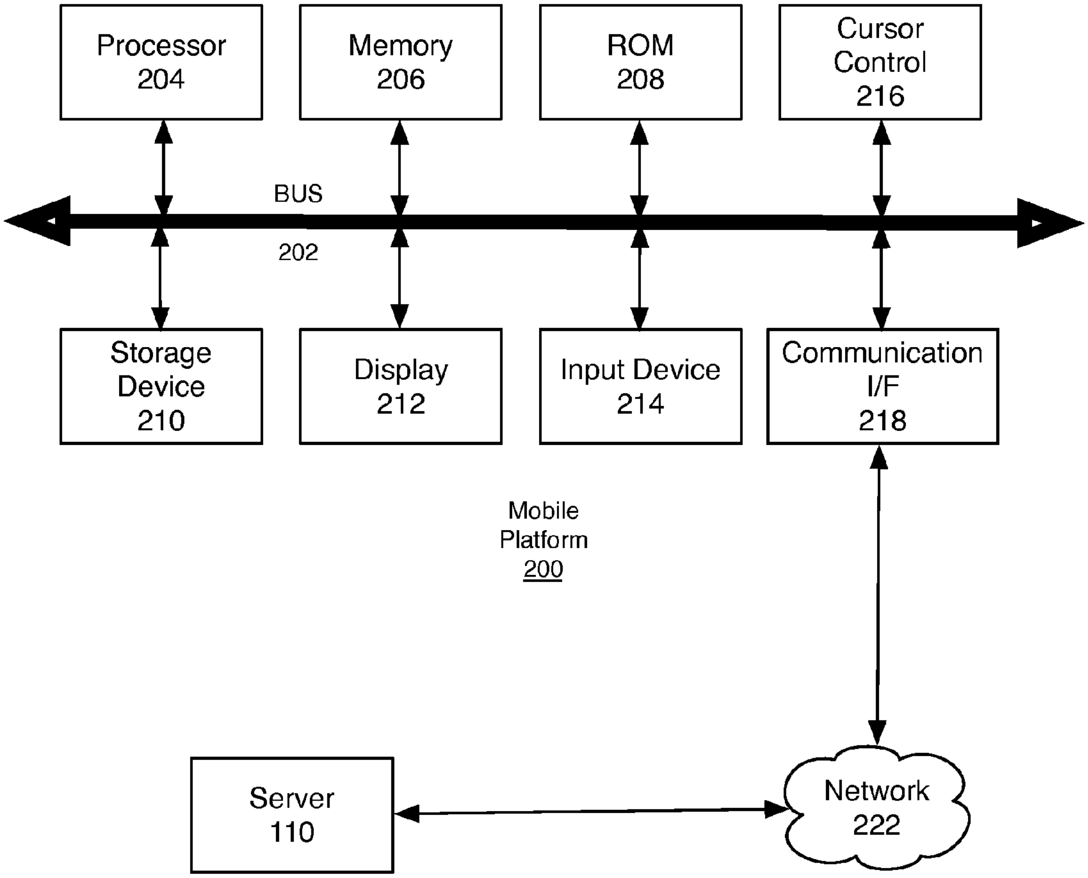
FIG. 2 illustrates an exemplary platform upon which instantiated of the present invention may be realized.

As should be evident from the foregoing discussion, various embodiments of the present invention may be implemented with the aid of computer-implemented processes or methods (a.k.a. programs or routines) that may be rendered in any computer-readable language. An example of an administrative device or mobile communication device platform 200 on which embodiments of the present invention may be instantiated (e.g., in the form of computer-readable instructions stored in one or more computer-readable storage mediums such as, but not limited to, any type of disk including floppy disks, optical disks, compact disk read only memories (CD-ROMs), and magnetic-optical disks, read-only memories (ROMs), flash drives, random access memories (RAMs), erasable programmable read only memories (EPROMs), electrically erasable programmable read only memories (EEPROMs), flash memories, other forms of magnetic or optical storage media, or any type of media suitable for storing electronic instructions) is shown in FIG. 2.

Platform 200 includes a bus 202 or other communication mechanism for communicating information, and a processor 204 coupled with the bus 202 for processing information. Platform 200 also includes a main memory 206, such as a RAM or other dynamic storage device, coupled to the bus 202 for storing information and instructions to be executed by processor 204, such as software application 160 and/or 180. Main memory 206 also may be used for storing temporary variables or other intermediate information during execution of instructions to be executed by processor 204. Platform 200 further includes a ROM 208 or other static storage device coupled to the bus 202 for storing static information and instructions for the processor 204. A storage device 210, such as a flash drive, is provided and coupled to the bus 202 for storing information and instructions.

Platform 200 may also include a display 212 for displaying information to a user. An input device 214, including alphanumeric and other keys, may be provided as well (e.g., for communicating information and command selections to the processor 204). Another type of user input device is cursor control 216, such, gestural control, a trackball or cursor direction keys, may be provided for communicating direction information and command selections to processor 204 and for controlling cursor movement on the display 212. In other instances, the alphanumeric and cursor inputs may be provided via a touch-sensitive display.

According to one embodiment of the invention, the forgoing methods and data structures are instantiated in computer software executed by platform 200, which is by processor 204 executing sequences of instructions contained in main memory 206. Such instructions may be read into main memory 206 from another computer-readable medium, such as storage device 210. Execution of the sequences of instructions contained in the main memory 206 causes the processor 204 to perform the process steps described herein.

Platform 200 may also include a communication interface 218 coupled to the bus 202. Communication interface 208 provides for two-way data communication to and from the platform 200. For example, communication interface 218 may include a wireless radio configured to operate with a telecommunication carrier's network and/or a computer communication network (e.g., a Wi-Fi or other such network). In any such implementation, communication interface 218 sends and receives electrical, electromagnetic or optical signals, which carry digital data streams representing various types of information. For example, two or more platforms 200 may be networked together with each using a respective communication interface 218. Also, a platform 200 may communicate with a server 110 (e.g., one which provides the evaluation service discussed above) via communication interface 218 and a network 222.

Figure 3A:
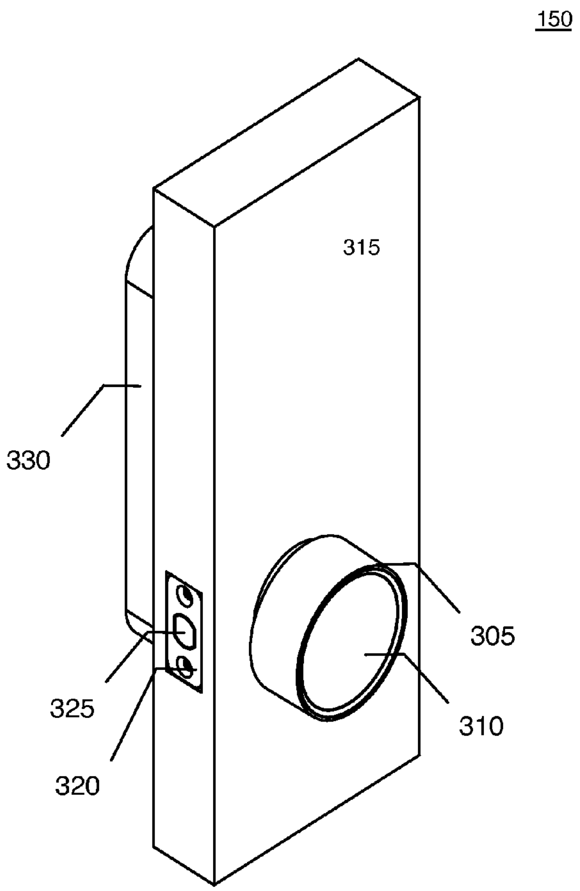
FIGS. 3A and 3B illustrate side perspective views of an exemplary locking apparatus when installed within a door, consistent with an embodiment of the present invention.

FIG. 3A illustrates a front perspective view of an exemplary locking device 150 placed within a door 315. Locking apparatus 300 includes a housing 305 and a control panel 330 affixed to either side (e.g., front and back) of door 315. Control panel may house one or more components configured to operate locking apparatus 300, such as, but not limited to a power source, a processor, and a transceiver. At times, one or more components included within locking apparatus 300 may be network enabled and may be connected to, for example, a server (not shown). Exemplary networks include the Internet, a local area network (LAN) and/or a wireless LAN (WLAN).

Figure 3B:
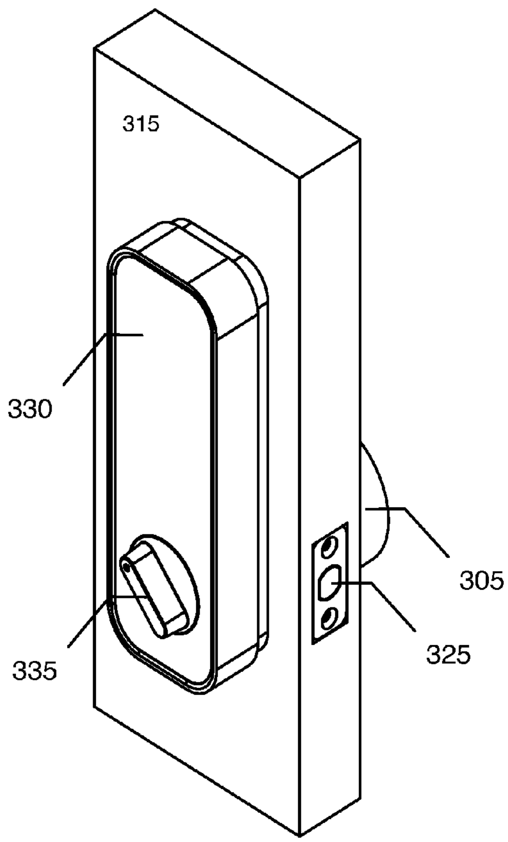

Housing 305 may include a faceplate 310. Locking device 150 may further include a deadbolt 325 positioned within a bracket 320 that may be affixed to door 315. FIG. 3B illustrates a rear perspective view of locking device 150 placed within door 315 wherein control panel 330 includes a thumb turn 335 for manually locking and unlocking deadbolt 325.

Figure 4:
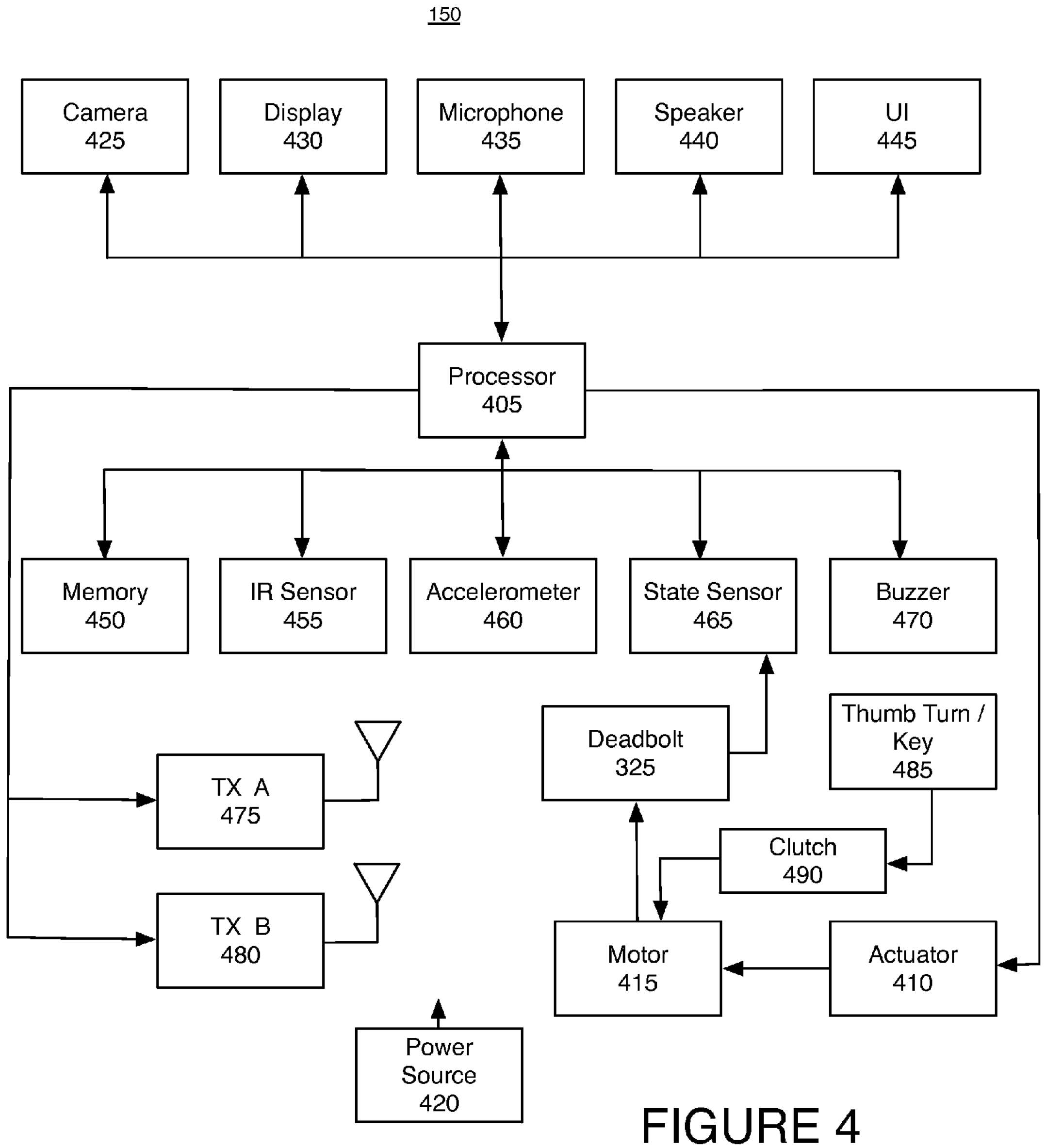
FIG. 4 depicts a block diagram of an exemplary locking device, consistent with an embodiment of the present invention.

FIG. 4 is a block diagram depicting exemplary components of locking device 150. The components depicted in FIG. 4 are provided by way of example and are in no way intended to limit the scope of the present invention. Locking device 150 may include a processor 405 communicatively coupled to the components of locking device 150 and may be capable of executing one or more methods described herein via interaction with these components.

Processor 405 may be coupled to power source 420. Exemplary power sources 420 include batteries, rechargeable batteries, a wired electrical connection, and/or some combination thereof. Locking device 150 may include one or more transceivers, such as, transceiver A 475 and transceiver B 480. Transceivers A and B 475 and 480 may be enabled to communicate via, for example, electromagnetic or cellular signals, including but not limited to radio signals, ultrasonic signals, infrared signals, short-wavelength radio signals, telecommunication signals, cellular communication signals, near-field communications (NFC) signals, Bluetooth™ signals, Bluetooth™ low energy signals, and Wi-Fi signals.

Transceivers A and B 475 and 480 may be configured to receive electronic key 125 and forward the received electronic key 125 to processor 405. Processor may then verify the access privileges associated with electronic key 125 and, upon verification may send an instruction to actuator 410. The instructions sent to actuator 410 may, in turn, induce actuator 410 to operate motor 415, enabling the translation of deadbolt 325 from an open position to a closed position or from a closed position to an open position thereby opening or closing locking device 150, as appropriate. Also shown in the diagram are manual controls such as a thumb turn and/or physical key cylinder 485 that act upon the deadbolt 325 directly (e.g., to open or close the lock). Also present is a clutch 490 to decouple the deadbolt from the motor so as to allow translation of the deadbolt by the thumb turn or the key.

In some embodiments, locking device 150 may include various components designed to enhance the functionality of locking device 150. For example, locking device 150 may include a camera 425 enabled to, for example, image in individual attempting to operate locking device 150. Display device 430 may be enabled to display information to a user. Exemplary information provided by display device 430 includes a personalized greeting, a status of locking device 150, and instructions regarding the operation of locking device 150. In one embodiment, the personalized greeting may include display of an image, for example an image of the last person to lock or unlock the locking device. The picture may be a default image or an image captured by a camera associated with the locking device. Alternatively, the image may be a picture of the user associated with the key being used to lock or unlock the locking device. Locking device 150 may further include a user interface 445 enabled to accept input from a user. In some cases, user interface 445 may include touchscreen capability for display 430.

In one embodiment, locking device 150 may further include a microphone 435 configured to capture an audio signal and/or a speaker 440 or buzzer 470 configured to transmit an audio signal. In this embodiment, microphone 435 and/or speaker 440 may be set up so as to enable one way and or two-way communication between an individual attempting to gain entry to a facility via locking device 150 and an administrator or security professional administering locking device 150 or facility.

Locking device 150 may further include an infrared sensor enabled to detect whether an individual is sufficiently close to locking device 150 to authorize operation (e.g., opening or closing) of locking device 150. For example, processor 405 may require infrared detection indicating that the user is within 1 meter of locking device 150 prior to authorizing a translation of deadbolt 325. In some embodiments, locking device 150 may further include an accelerometer 460 enabled to detect vibration or movement of locking device 150 and or a structure (e.g., door 115) housing locking device 150. Exemplary vibration or movement may be caused by, for example, an individual knocking on the structure or jiggling a door handle associated with locking device 150.

In some embodiments, locking device 150 may further include a state sensor 465 enabled to detect the state (e.g., open or closed) of deadbolt 325 and/or a structure (e.g., door 115) housing locking device 150.

Information gathered by one or more of the components of locking device 150 may be recorded in, for example, memory 450. Recorded information may be transmitted to, for example, administrative device 120 and/or server 110 on for example, an as-needed, as-requested, and/or periodic basis. When the recorded information is transmitted to server 110, it may be stored in database 170.

Figure 5:
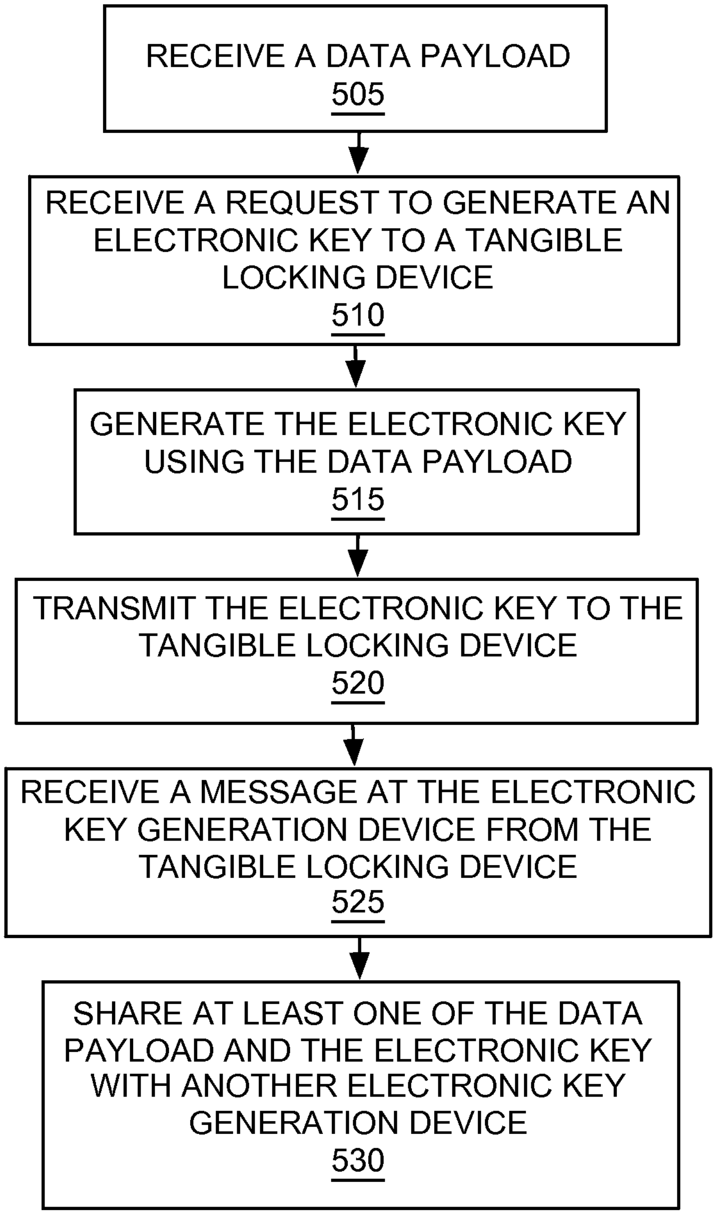
FIGS. 5-7 depict flowcharts for various processes executed by one or more components of the present invention.
Figure 6:
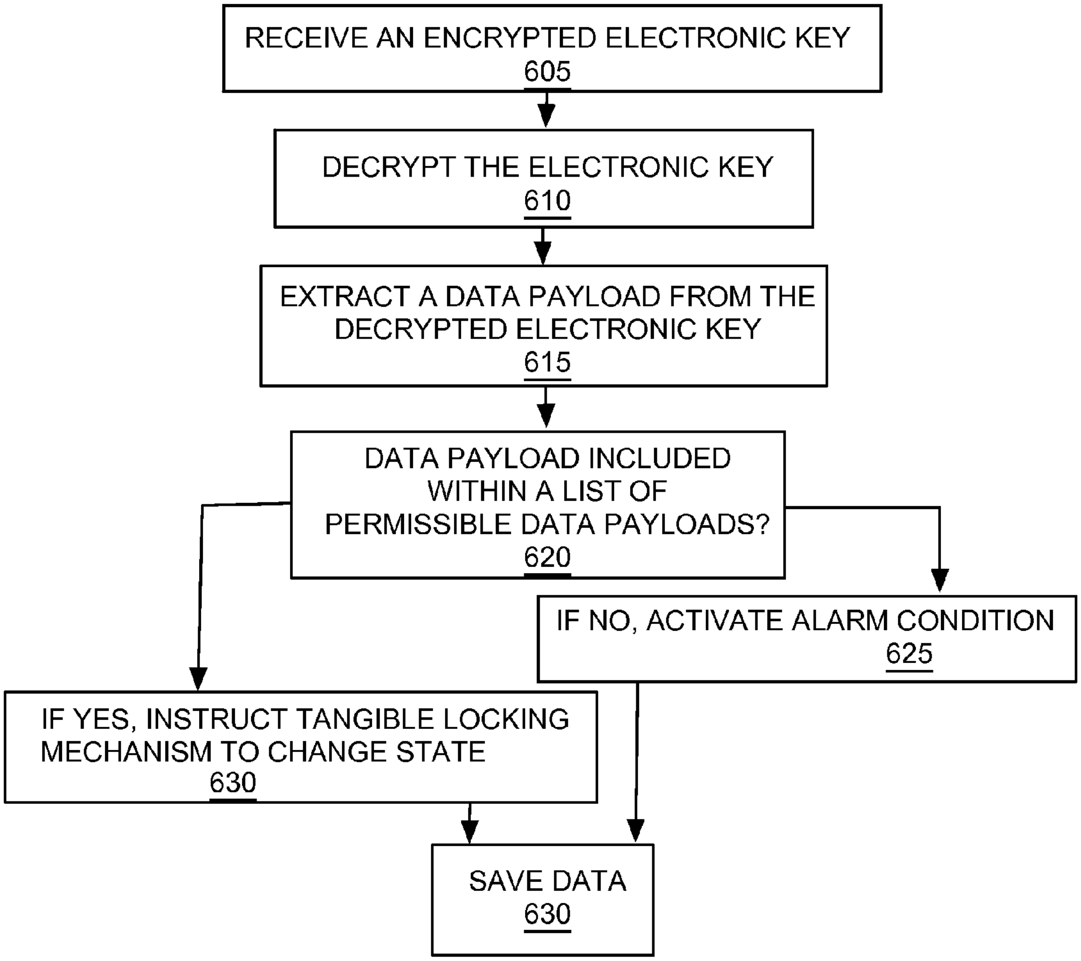
Figure 7:
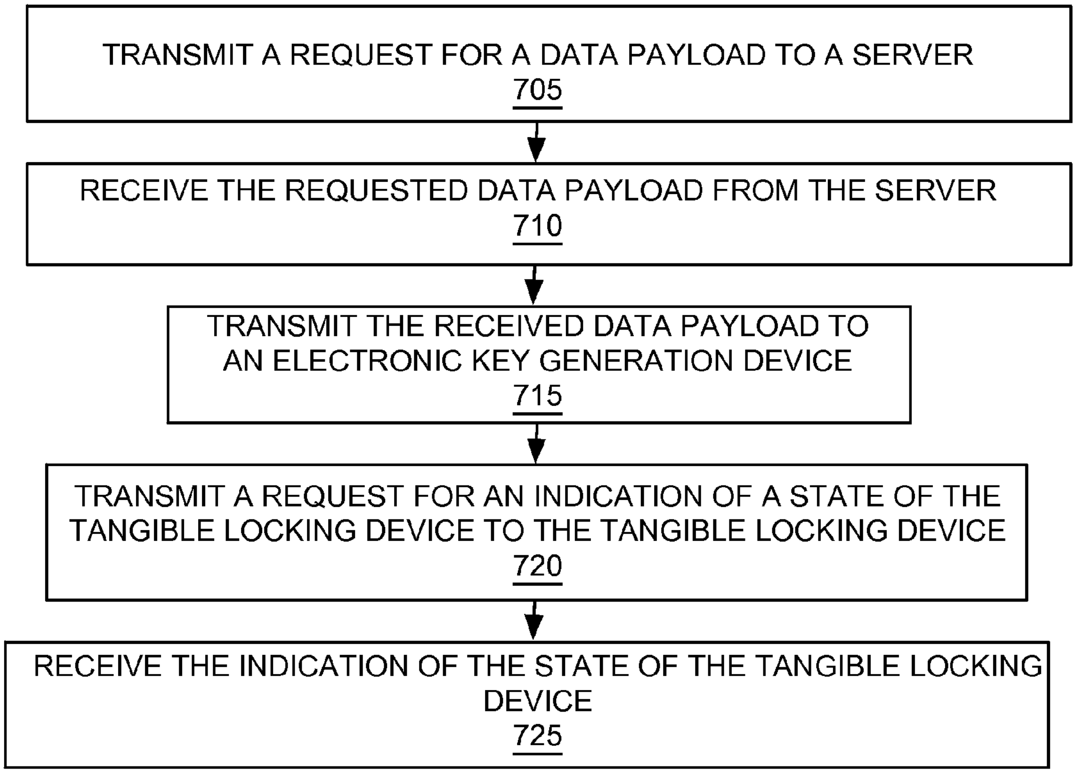

FIGS. 5-7 depict flowcharts for various processes executed by one or more components of the present invention. For example, execution of one or more steps of processes depicted in FIGS. 5-7 may be executed by an electronic key generation device, such as administrative device 120, mobile communication device 130 and/or key fob 140 when attempting to operate a locking device like locking device 150. On some occasions, execution of one or more steps of processes depicted in FIGS. 5-7 may be executed by way of a software application (e.g., software application 160 and/or 180) running on the electronic key generation device and/or administrative device.

As depicted in FIG. 5, process 500 begins when the electronic key generation device receives a data payload, such as data payload 115 (step 505). In step 510, a request to generate an electronic key may be received from, for example, a user of the electronic key generation device. The electronic key may include instructions to enable the locking and/or unlocking of the locking device. On some occasions, the electronic key may further include instructions to relock an opened lock, or reopen a closed lock, after the conclusion of a defined time period.

The electronic key may then be generated responsively to the request (step 515) and may be transmitted to the locking device (step 520) whereupon the locking device may verify the electronic key and, upon verification, proceed to open and/or close the lock. Exemplary modes of transmission of the electronic key include a wireless electromagnetic signal, such as cellular signals, radio signals, ultrasonic signals, infrared signals, short-wavelength radio signals, telecommunication signals, cellular communication signals, NFC signals, Bluetooth™ signals, Bluetooth™ low energy signals, and Wi-Fi signals.

Optionally, the electronic key generation device may receive a message from the locking device (step 525). Exemplary messages include personalized greetings (e.g., such as those discussed above) or a status of the locking device (e.g., open or closed). In some embodiments, the content of the message may be included within the electronic key.

As depicted in FIG. 6, process 600 begins, when an encrypted electronic key, similar to electronic key 125 is received by a locking device similar to locking device 150 receives (605). The electronic key may be received by a transceiver, such as transceivers A and B 475 and 480 via, for example, wireless electromagnetic signals, such as cellular signals, radio signals, ultrasonic signals, infrared signals, short-wavelength radio signals, telecommunication signals, cellular communication signals, NFC signals, Bluetooth™ signals, Bluetooth™ low energy signals, and Wi-Fi signals.

The encrypted electronic key is then decrypted (step 610) and a data payload, similar to data payload 115 may be extracted from the encrypted data (step 615). Then, in step 620, it may be determined whether the decrypted data payload is included on a list of permissible data payloads. When the decrypted data payload is not included on a list of permissible data payloads, an alarm condition may be activated (step 625). Exemplary alarm conditions include an audio signal emanating from the locking device, a message displayed upon the locking device, transmission of an alert to an administrator, such as administrative device 120, and/or transmission of an alert to a security agency (e.g., police or private security company). When the decrypted data payload is included on a list of permissible data payloads, lock drive means within the locking device, (in one embodiment instantiated as actuator 410, motor 415, state sensor 465 and deadbolt 325), may be instructed to change state (e.g., translate from a closed position to an open position or from the open position to the closed position) (step 630). Finally, whether the decrypted data payload is not included on a list of permissible data payloads, or not, data regarding the execution of process 600 may be recorded (step 630).

At times, prior to execution of step 605, the locking device may receive a list of permissible data payloads from an administrative device, such as administrative device 120. The list may then be stored in, for example, a memory communicatively coupled to the locking device. On some occasions, a modification to the list may also be received by the locking device and the list of permissible data payloads may be updated and stored accordingly.

In some embodiments, process 700 may include transmitting a message from the locking device to the electronic key generation device. In some cases, for example when the data payload associated with an electronic key is not included within the list of permissible data payloads, the message sent to the electronic key generation device may act to disable, or otherwise nullify, the electronic key generation device.

As depicted in FIG. 7, process 700 begins when a request for a data payload is transmitted by administrative device, such as administrative device 120, to a server, such as server 110 (step 705). In step 710, the requested data payload, such as data payload 115, may be received from the server at the administrative device. The data payload may be in an encrypted, or unencrypted, format. The administrative device may then transmit the received data payload in an encrypted or unencrypted format to an electronic key generation device such as, mobile communication device 130 or key fob 140 (step 715).

Optionally, administrative device may transmit a request for an indication of the state of the locking device (e.g., open or closed) to the locking device (step 720) and an indication of the state of the locking device may be received responsively to the request (step 725).

Thus, electronic locking systems, apparatus, and methods have been herein described.

What is claimed is:

1. A method comprising:

receiving, by an electronic key generation device, a data payload from at least one of an administrative device and a server;

receiving, by the electronic key generation device, a first request from a user of the electronic key generation device to generate an electronic key to a tangible locking device;

generating using the data payload, responsive to the received first request, by a processor of the electronic key generation device, the electronic key, wherein the electronic key includes instructions to change a lock state of the tangible locking device, said instructions, when verified by the tangible locking device using the electronic key, enabling automatic locking of the tangible locking device if the tangible locking device is in an unlocked state, or automatic unlocking of the tangible locking device if the tangible locking device is in a locked state;

transmitting, by the electronic key generation device, to the tangible locking device, a second request for an indication of a current state of the tangible locking device, wherein the current state is either the unlocked state or the locked state, and receiving, by the electronic key generation device and from the tangible locking device responsively to the second request, the indication of the current state of the tangible locking device; and transmitting, by the electronic key generation device, the electronic key to the tangible locking device.

2. The method of claim 1, wherein the electronic key generation device is at least one of a mobile telephone, a key fob, a mobile communication device, and a portable computer.

3. The method of claim 1, wherein the first request is received from the user via a software application running on the electronic key generation device.

4. The method of claim 1, wherein the data payload is specific to at least one of the user of the electronic key generation device and the electronic key generation device.

5. The method of claim 1, wherein the generation of the electronic key includes encrypting the data payload.

6. The method of claim 1, wherein the at least one administrative device and server are wirelessly coupled to the processor via a communication network.

7. The method of claim 1, wherein electronic key is transmitted from the electronic key generation device to the locking device via a wireless electromagnetic signal.

8. The method of claim 7, wherein the wireless electromagnetic signal is at least one of a cellular signal, a radio signal, an ultrasonic signal, an infrared signal, a short-wavelength radio signal, a telecommunication signal, a cellular communication signal, a near-field radio signal, a Bluetooth™ signal, a Bluetooth™ low energy signal, and a Wi-Fi signal.

9. The method of claim 1, wherein the data payload cannot be transferred from the electronic key generation device to another device.

10. The method of claim 1, further comprising receiving a message at the electronic key generation device from the tangible locking device.

11. The method of claim 10, wherein the message is one of a personalized greeting, a status of the locking device, a graphic, a uniform resource locator (URL), and an indication of recent activity at the tangible locking device.

12. The method of claim 11, wherein the personalized greeting includes an image.

13. The method of claim 12, wherein the image comprises an image of a last individual to lock or unlock the tangible locking device.

14. The method of claim 12, wherein the image comprises an image of a user associated with the electronic key.

15. The method of claim 1, wherein at least one of the data payload and the electronic key is unique to the electronic key generation device.

16. The method of claim 1, further comprising sharing at least one of the data payload and the electronic key with another electronic key generation device.

17. The method of claim 1, further comprising:

receiving, by the electronic key generation device, from the server, information regarding a status of the tangible locking device.

* * * * *